US009222492B2

(12) United States Patent
Zeolla et al.

(10) Patent No.: US 9,222,492 B2
(45) Date of Patent: Dec. 29, 2015

(54) FLUID COOLING DEVICE

(75) Inventors: Guiseppe Zeolla, Minusio (CH); Luca Mariani, Valsolda (IT)

(73) Assignee: HYDAC AG, Steinhausen (CH)

( * ) Notice: Subject to any disclaimer, the term of this patent is extended or adjusted under 35 U.S.C. 154(b) by 409 days.

(21) Appl. No.: 13/261,438

(22) PCT Filed: Mar. 22, 2011

(86) PCT No.: PCT/EP2011/001399
§ 371 (c)(1),
(2), (4) Date: Dec. 17, 2012

(87) PCT Pub. No.: WO2011/116924
PCT Pub. Date: Sep. 29, 2011

(65) Prior Publication Data

US 2013/0081387 A1 Apr. 4, 2013

(30) Foreign Application Priority Data

Mar. 26, 2010 (DE) ........................ 10 2010 012 952

(51) Int. Cl.
*F28D 1/06* (2006.01)
*G01F 23/02* (2006.01)
(Continued)

(52) U.S. Cl.
CPC ............... *F15B 21/042* (2013.01); *F04B 23/02* (2013.01); *F15B 1/26* (2013.01); *B65D 25/56* (2013.01); *Y10T 137/6525* (2015.04)

(58) Field of Classification Search
USPC ......................... 137/340, 558, 270, 338, 339; 73/323-331, 1.73, 149, 290 B; 220/629, 631, 663, 89.1; 165/11.1, 132
See application file for complete search history.

(56) References Cited

U.S. PATENT DOCUMENTS 1,142,262 A * 6/1915 Mendenhall .................. 220/663
2,294,473 A * 9/1942 Makeley .................... 229/162.2
(Continued)

FOREIGN PATENT DOCUMENTS

AT 010 226 U1 9/2008
DE 196 52 706 A1 6/1997
(Continued)

OTHER PUBLICATIONS

Bucher Hydraulics: "Hydraulic Units UP100—S309 Version". Jan. 2009, XP55004110 42100 Reggio Emilia, Italy p. 36 pp. 39-44 pp. 92-93.

(Continued)

*Primary Examiner* — Kevin Murphy
*Assistant Examiner* — Jonathan Waddy
(74) *Attorney, Agent, or Firm* — Wenderoth, Lind & Ponack, L.L.P.

(57) ABSTRACT

A fluid cooling device (1) as a structural unit has a drive motor (2) driving a rotatable fan impeller (3) and has a storage tank (4) with a filling opening (6) and a fill-level indicator (7). Fluid can be conveyed from the tank into a hydraulic working circuit. In the hydraulic working circuit, the fluid is heated and is cooled via a heat exchanger (5) of the structural unit, and returned into the storage tank (4). The structural unit is designed as a turning assembly in which the filling opening (6) for fluid and the fill-level indicator (7) are disposed on the storage tank (4) such that they can be used and read in a first vertical installation direction (X, Y) of the structural unit, and in a second installation direction (Y, X) inclined with respect to the first installation direction (X, Y), preferably at a right angle.

20 Claims, 3 Drawing Sheets

(51) Int. Cl.

| | |
|---|---|
| ***B65D 25/56*** | (2006.01) |
| ***F15B 21/04*** | (2006.01) |
| ***F04B 23/02*** | (2006.01) |
| ***F15B 1/26*** | (2006.01) |

(56) References Cited

U.S. PATENT DOCUMENTS

| | | | | | |
|---|---|---|---|---|---|
| 3,276,488 | A | * | 10/1966 | Holmes | 141/311 R |
| 3,505,870 | A | * | 4/1970 | Smylie | 73/323 |
| 3,603,694 | A | * | 9/1971 | Hamm | 401/150 |
| 4,360,152 | A | * | 11/1982 | Schlatter et al. | 237/13 |
| 5,121,788 | A | * | 6/1992 | Carollo | 165/47 |
| D356,951 | S | * | 4/1995 | Mitchell et al. | D23/211.2 |
| 6,082,591 | A | * | 7/2000 | Healey | 222/158 |
| 7,506,541 | B2 | * | 3/2009 | Woodard et al. | 73/149 |
| 7,597,000 | B2 | * | 10/2009 | Bell et al. | 73/323 |
| 2004/0099672 | A1 | * | 5/2004 | Perlman | 220/631 |
| 2006/0032854 | A1 | * | 2/2006 | Schutz | 220/562 |

FOREIGN PATENT DOCUMENTS

| | | | | |
|---|---|---|---|---|
| DE | 103 28 177 | A1 | | 1/2005 |
| WO | WO 98/42986 | A1 | | 10/1998 |
| WO | WO2009009810 | A1 | * | 1/2009 |

OTHER PUBLICATIONS

Hawe: "Compact hydraulic power packs type HC and HCW" 2009, pp. 1.1-8-1.1-9, XP55004114 München, Germany.

* cited by examiner

FLUID COOLING DEVICE

FIELD OF THE INVENTION

The invention relates to a fluid cooling device as a structural unit having a drive motor that drives a rotatable fan impeller and that has a storage tank with a filling opening and a fill-level indicator. Fluid can be conveyed from the storage tank into a hydraulic working circuit, where in the hydraulic working circuit the fluid is heated and cooled via a heat exchanger of the structural unit, and preferably can be returned to the storage tank.

BACKGROUND OF THE INVENTION

Fluid cooling devices as part of compact hydraulic assemblies or as a functional unit for a hydraulic working circuit are fundamentally known. They generally include a cooling device having a radiator with a fan blower and a storage tank attached to it for a circulating fluid. Such fluid cooling devices are used in both stationary and mobile applications in motor vehicles, in particular commercial vehicles or heavy machinery, in which additional hydraulic circuits can be temporarily used.

DE 103 28 177 A1 describes a fluid cooling device as a modular structural unit with a drive motor that drives a fan blower and a pressurized fluid pump. A fluid (hydraulic oil) is conveyed out of a storage tank into a hydraulic working circuit with at least one consumer. The pressurized fluid is heated in the hydraulic working circuit in the operation of the hydraulic working circuit and is cooled again via a cooling device before it travels again into the storage tank. The storage tank generally comprises the fan blower or fan impeller in the manner of a flow guidance apparatus or in the form of a NACA ring. As a result, an improved blower flow and a damping action of operating noise of the fan blower are effected. Moreover, the mechanical measures reduce the number of components and the installation effort for this fluid cooling device.

WO 98/42986A1 describes a fluid cooling device that forms a compact structural unit including a motor that drives a fan impeller and a fluid pump. In the hydraulic working circuit, the fluid is heated by flow losses and adiabatic processes and is routed to a heat exchanger. The fluid is returned again from the fluid cooling device to the oil tank. The oil tank is made trough-shaped with walls that partially reshape the motor and the fluid pump. The illustrated fluid cooling device constitutes a compact design that manages without pipe connections so that the structural unit of a filter, a pump unit and a cooling unit can be connected in a space-saving manner to an oil tank without further piping.

However, the fluid cooling devices described above only by way of example and readily available on the market are special solutions that have been developed and adapted more or less specifically for certain installation situations on site. They do not allow, for example, a different spatial arrangement, for instance as a turning assembly. Their concept, the type and arrangements, especially of fluid ports and filling openings or fill-level indicators, define a fixed installation situation in their mechanical environment that in this respect cannot be changed.

SUMMARY OF THE INVENTION

An object of the invention is to provide an improved fluid cooling device that enables different installation directions and yet is structurally simple, especially with respect to its components, such as the filling opening, the fill-level indicator, and the pertinent fluid ports.

This object is basically achieved by a fluid cooling device having a structural unit (fluid cooling device) made as a turning assembly in which a filling opening, preferably provided with a filter device, and a fill-level indicator are located on the storage tank such that the structural unit can be installed in at least two installation directions, preferably according to two major axes and preferably in a vertical installation direction and in a horizontal installation direction located at a right angle to the vertical direction. A structural measure is devised for installing the fluid cooling device in different installation positions and for managing with a minimum number of fill-level indicators and filling openings, specifically preferably with only one indicator or opening at a time. Preferably, the fluid cooling device can be installed in at least two different installation positions on a third component with a single filling opening and with a single fill-level indicator that are made correspondingly, without operational failures.

To enable proper filling of the storage tank with fluid and to be able to read the fill level regardless of the installation position of the fluid cooling device, whether in the direction of a vertical major axis or in the direction of a major axis intersecting the vertical axis, the filling opening and the fill-level indicator are arranged in a corner region of the storage tank. The pertinent corner region is characterized by a flattening of the pertinent corner of the storage tank, that is, by a removal of the corner formed by the three wall surfaces that are otherwise tapered toward one another. Instead of the indicated corner, a wall or a corner surface is formed that intersects all three pertinent planar wall surfaces at roughly 45° and that enables the arrangement of the filling opening at the apex of the boundary lines of the individual wall surfaces of the storage tank. The storage tank preferably has a cuboid or rectangular solid shape with edges extending roughly parallel to one another on the individual side surfaces that are roughly the same length in one preferred embodiment.

Adjacent to the filling opening, which opening can also be equipped with a filter device and a pressure equalization apparatus, the fill-level indicator can be provided. The fill-level indicator is preferably formed by scaling made directly and preferably integrally with the wall of the storage tank. The scaling is located around a check opening or check indicator (inspection glass) that is recessed in the wall of the storage tank. The storage tank is preferably a thermoplastic tank formed in a forming method or blow molding method so that the scaling in the form of spaced graduation marks can be done at the same time in the production of the storage tank.

Instead of spaced graduation marks, however, only ever one individual fill-level mark at a time can also be provided that, for example, shows a maximum or minimum fill-level height in the storage tank, with the scaling or the individual graduation mark indication including a right angle with the pertinent second scaling or the second individual graduation mark indication. Otherwise, the scaling can be obtained by a corresponding shaping within a deep drawing mold or blow mold for the production of the storage tank.

Preferably, the walls of the storage tank are made transparent so that the fill level can be directly read on the scaling used. To effect UV radiation shielding for the pertinent fluid, the storage tank can be formed from a milky-cloudy plastic or from a nontransparent plastic so that the fill level can advantageously be read at the same time on a transparent sealing element that closes the check opening in the form of an inspection glass in whose adjacent wall region the respective scaling is again located to be able to adjust the fill level between the amount shown in the inspection glass and the adjacent scaling.

In one preferred embodiment, the sealing element need not be made transparent if the wall of the storage tank is transparent. If, however, the wall of the storage tank is not transparent, a transparent sealing element is recommended to be used for the check opening in the form of the inspection glass. There can also be partial transparency for the wall of the storage tank such that checking of the balancing between the scaling and the fill-level height in the storage tank is still enabled.

To protect against damage, the fill-level indicator can be inserted in a depression of the wall outline of the storage tank. The scaling includes preferably an imaginary angle of 90° to one another in a corresponding arrangement directly adjacent around the check opening.

The storage tank is used as a support for the fan impeller together with the drive motor and surrounds the fan impeller preferably as a frame so that a fluid-filled box structure around the rotatable fan impeller is implemented. The storage tank and its shape can be chosen such that on the one hand it can be used as a guide apparatus for inflowing air and on the other hand forms a good damping measure for possible operating noise of the fan impeller. Cooling air preferably flows through the storage tank. The heat exchanger through which the heated fluid flows can likewise be an integral component of the storage tank, preferably encompassing the heat exchanger at least on two opposite sides and securing it on a box construction or frame construction of the storage tank.

Advantageously the heat exchanger is integrated into the outline of the storage tank such that overall a cuboid or a cuboid-like shape of the fluid cooling device as a structural unit arises that in this respect manages without noteworthy attachment parts and projections for mounting on third components.

A pressure relief valve of the fluid cooling device adjacent to the filling opening and the fill-level indicator can likewise be a component of the storage tank. In this context, the operation of the fluid cooling device also would become possible without any reservation by changing the installation position, based on considerations related to safety engineering, owing to the pressure relief valve.

Also advantageously, the different fluid ports can be made on the storage tank or the fluid cooling device rearrangeable for matching to technical specifications of the hydraulic working circuit. This arrangement in turn promotes the overall modular structure of the fluid cooling device with its components.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure and that are schematic and not to scale.

DETAILED DESCRIPTION OF THE INVENTION

Figure 1:
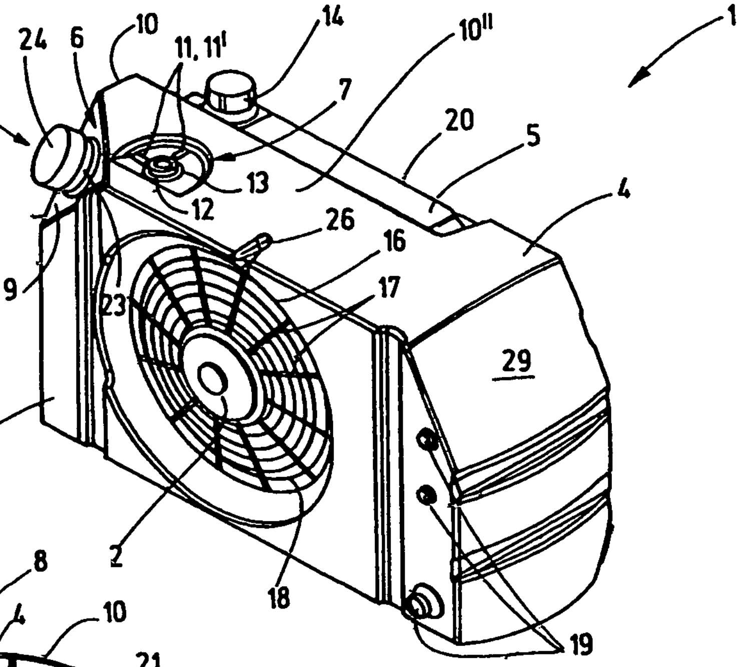
FIG. 1 is a perspective view of a fluid cooling device according to an exemplary embodiment of the invention.

FIG. 1 shows in a perspective, schematic view a fluid cooling device 1 for holding and cooling a fluid that can be introduced into a hydraulic working circuit of a commercial vehicle (not shown). The fluid can be a hydraulic oil for a connectable hydrostatic or mechanical transmission of the motor vehicle. The fluid cooling device 1 can also be integrated into existing hydraulic drive circuits of propulsion machinery or machine tools to cool the corresponding working hydraulic oil.

Figure 2:
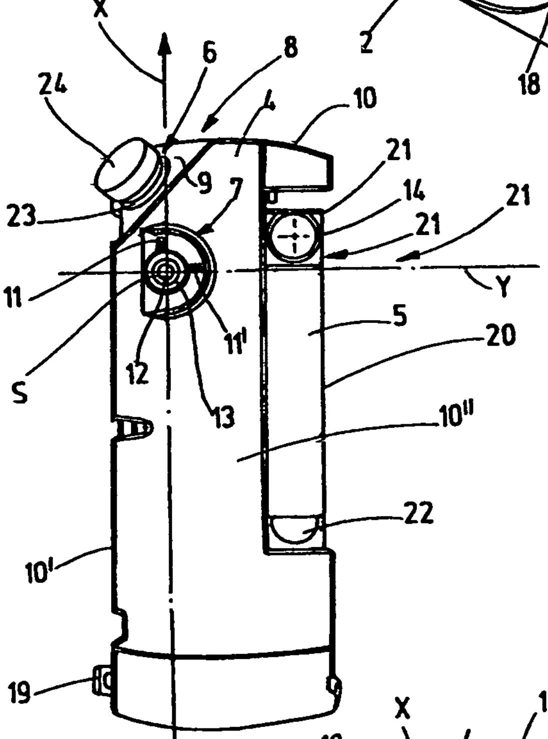
FIG. 2 is a side elevational view of the fluid cooling device of FIG. 1 in the vertical installation direction.
Figure 3:
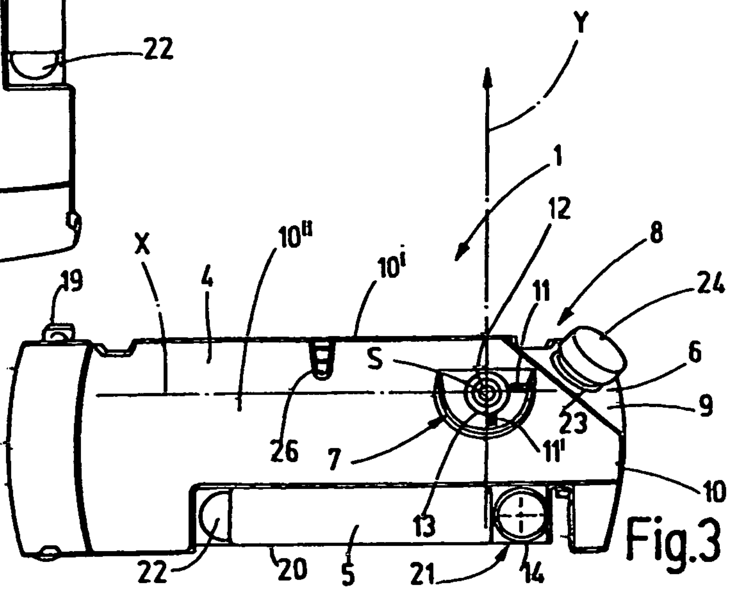
FIG. 3 is a side elevational view of the fluid cooling device of FIG. 1 in the horizontal installation direction by the fluid cooling device being pivoted by a pivot angle of 90° clockwise in the direction of FIG. 1.
Figure 4:
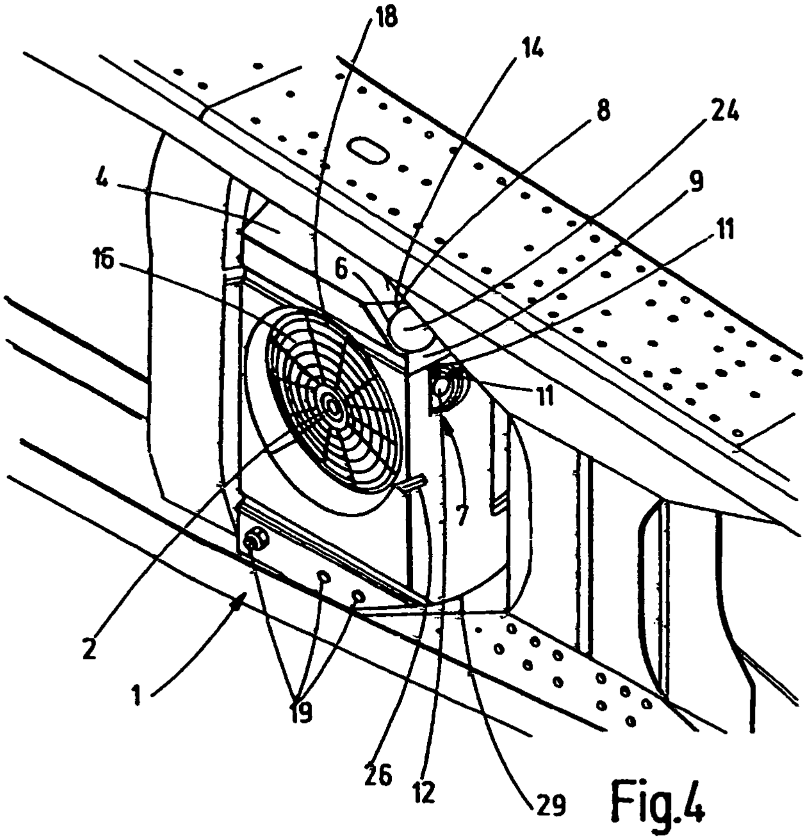
FIG. 4 is a perspective view of one installation example of the fluid cooling device of FIG. 1 in a vehicle frame in the vertical installation direction.

FIGS. 2 and 3 shows two possible installation positions of the fluid cooling device 1, with the installation position in FIG. 2 showing a substantially vertical alignment of the fluid cooling device 1 and the alignment according to FIG. 3 showing a horizontal arrangement of the fluid cooling device 1. In this respect, the vertical installation configuration according to FIG. 2 corresponds to the installation situation according to FIG. 4. For the horizontal arrangement according to FIG. 3, the fluid cooling device 1, which is shown in FIGS. 1 and 5, would be shown tilted into or out of the plane of the figure around the axis of incline by 90° respectively.

Figure 5:
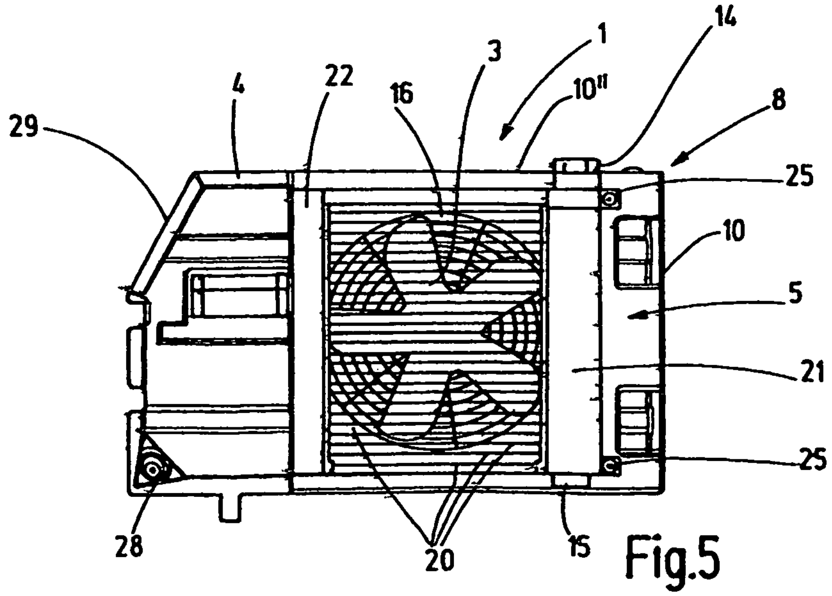
FIG. 5 is a rear side view of the fluid cooling device of FIG. 1 with a view of the heat exchanger in the form of a finned radiator integrated in the storage tank of the fluid cooling device.

Essential components of the fluid cooling device 1 are a storage tank 4 describing the shape of the fluid cooling device 1, a drive motor 2, for example, in the form of a direct current electric motor, and a fan impeller 3 driven by the motor (see FIG. 5). Free side surfaces of the shape of the fluid cooling device 1, defined overall by a cuboidal or solid rectangular shape of the storage tank 4, are used to secure the fluid cooling device 1.

FIG. 1 furthermore shows a front of the fluid cooling device 1, with the storage tank 4 for fluid, formed in a rotation blow molding method from preferably polyethylene plastic, offering a substantially rectangular front to the viewer. The drive motor 2, suspended as a hub motor in a round blower opening 16 roughly in the center of the storage tank 4 drives a five-blade fan impeller 3. In operation, fan impeller 3 produces a cooling air flow in the direction of FIGS. 1, 4, and 5 in the parallel direction through the blower opening 16.

Fins 17 extend radially from the drive motor 2 and in the manner of bridges to the edge of the blower opening 16, and can be used as a rectifier for smoothing of the coolant air flow and to stiffen the respective cover grating 18 for the fan impeller 3. Depending on the execution of the fan impeller, the flow direction of the cooling air through the blower opening 16 could also be provided inversely, in particular, if certain installation situations of the fluid cooling device 1 should require that arrangement. An inverse flow air reversal can also be achieved by an inverse direction of rotation of the blades in fan operation. The storage tank 4 has a conically tapering shape in the form of an inlet funnel to the blower opening 16. The inlet funnel is closed by the cover grating 18 so that inlet losses for the blower are small, and the flow characteristic of the cooling air through the storage tank 4 is favorable.

Viewed in the direction of FIG. 1, the storage tank 4 on its right side wall has a bevel 29 that constitutes a custom feature and that may also result from the respective installation situation for the fluid cooling device 1. On the right lower side, viewed in the direction of FIG. 1, on the front wall routed or extending around the blower opening 16, different connecting pieces or connectors 19 for the leakage oil supply from the hydraulic working circuit (not detailed) are provided. Furthermore, different U-shaped grooves extend vertically and horizontally, viewed in the direction of FIG. 1, and can facilitate positive securing in position on a support or on chassis parts of the motor vehicle structure and otherwise stiffen the tank construction. This arrangement also yields correspondingly large contact surfaces separated from one another for securing of the storage tank 4 on third components.

As FIG. 5 shows, the blower air flow is routed or conveyed centrally onto the cooling fins 20 of a heat exchanger 5 that extend horizontally in FIG. 5. The cooling fins 20 extend at the same distance to one another from a box-shaped inlet distribution channel 21 to a likewise box-shaped outlet channel 22 that diverts cooled fluid back into the interior of the storage tank 4. The channels 21, 22 are located perpendicular to the cooling fins 20. The entire heat exchanger 5 can be made both as a casting and in a sheet metal construction with solder or weld connections.

The heat exchanger 5 has a pressure relief valve 14 installed on one upper side of the inlet distribution channel 21 and discharging in the region of an upper side wall 10" (compare FIG. 1) of the storage tank 4. To enable installation of the fluid cooling device 1 in the two installation directions X, Y that are perpendicular to one another, a filling opening 6 is on the upper left corner region 8, viewed in the direction of FIG. 1, on the fluid cooling device 1 having a filler stub 23 with an external thread onto which a sealing cover 24 with knurling is screwed. The indicated corner region is defined by a wall surface that in a plan view is triangular and connects side walls 10, 10', 10" of the storage tank 4 to one another. Within the sealing cover 24, a filter element (not detailed), can be integrated in the conventional manner.

The planar wall surface 9 is made integral with the other planar walls of the storage tank 4. Adjacent to the filling opening 6, a fill-level indicator 7 is on the top side wall 10", as shown in FIG. 1, of the storage tank 4. Indicator 7 has a round fill-level check opening 13 in the form of an inspection glass and two scalings 11, 11' oriented a right angle to one another. The respective scaling 11, 11' can each be an individual mark indication according to this embodiment that provides the viewer an indication of the desired maximum or minimum volumetric level in the storage tank 4, or can be a multiple mark arrangement allowing a conclusion about the defined amount held in the storage tank 4. In the embodiment as shown in FIGS. 2 and 3, one scaling 11 is parallel to the installation direction X, and the other scaling 11' is parallel to the mounting installation direction Y.

The point S of intersection of the two scaling regions 11, 11' forms the midpoint of the fill-level check opening 13. The fill-level check opening 13 (inspection glass) is spaced at a distance from the filling opening 6 by roughly ⅛ to ⅕ of the total length or total width of the storage tank 4. The respective position of the check opening 13 in conjunction with the respective scaling 11, 11' is dependent on which fill level is dictated for the respective storage tank 4 on the user side. A sealing element 12 in the form of a clipped-in plastic cap seals the fill-level check opening 13. The sealing element is made transparent in the illustrated exemplary embodiment so that the fluid level can also be read on the sealing element 12.

As FIGS. 2 and 3 show in a respective view of the side wall 10", the heat exchanger 5 is located off-center with its pressure relief valve 14 on the storage tank 4 and, viewed with reference to all side walls of the storage tank 4, is integrated roughly flush into the cuboid overall shape of the tank 4. The cooling fins 20 (see FIG. 5) have a rectangular, strip-like plan shape with uniform width and thickness over their entire length. The heat exchanger 5 is made modular as an independent component and can be connected to the storage tank 4 to carry fluid via plug connections without piping. This yields a very quick and simple overall installation option.

As FIG. 5 in a rear view of the heat exchanger 5 shows, heat exchanger 5 is connected to the storage tank 4 on its inlet distribution channel side 21 with screws on two clips 25. On the side of its outlet channel 22, the heat exchanger 5 is inserted into undercuts of the storage tank 4 in a positive, detachable manner. A positive, detachable connection of the heat exchanger 5 can be provided in addition on its inlet distribution channel side 21 so that overall installation is simple, and the heat exchanger 5 is in extensive surface connection to the storage tank 4.

The storage tank 4 with its components, due to its manner of production manufactured as a plastic part in a blow molding or rotation molding method, such that mechanical and hydraulic connection options and cable guides for cable sets of the electric drive motor 2 can be provided. Thus, in FIGS. 1 to 3, a gap 26 for cable routing is located approximately in the middle on an edge of the side wall 10", which edge is adjacent to the grating 18 for the fan impeller 3. The power supply for the drive motor 2 can be carried out in the indicated manner through the gap 26.

Figure 6:
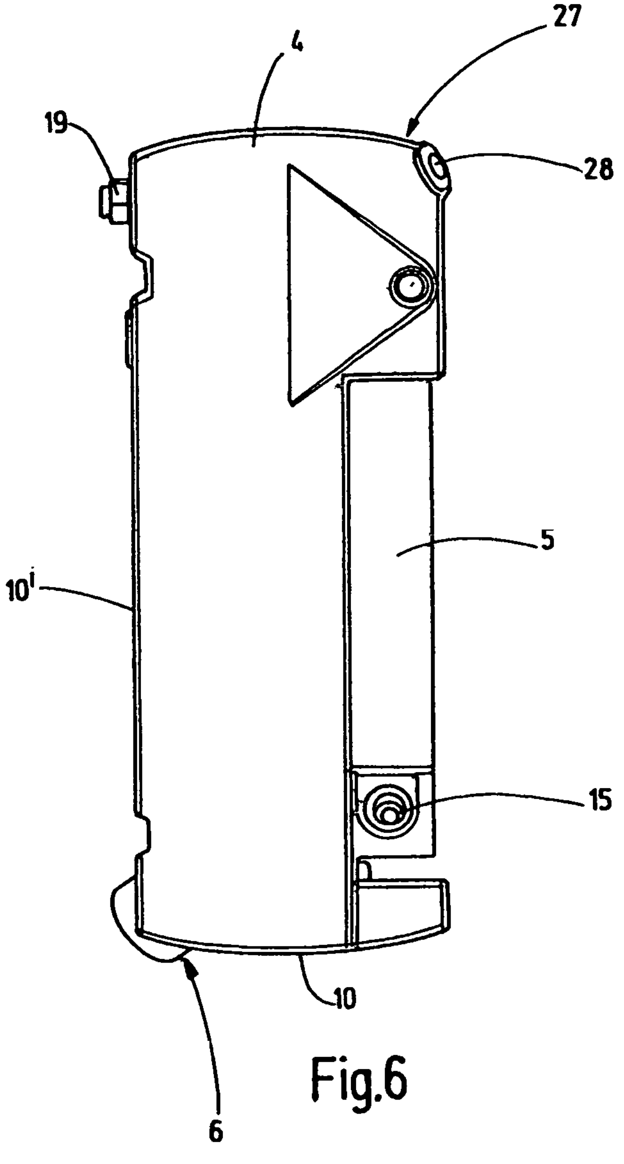
FIG. 6 is a plan view of the lower or bottom side of the fluid cooling device of FIG. 1 viewed from underneath.

FIG. 6 in turn shows a view of the bottom of the fluid cooling device 1 together with that side from which the fluid is taken from the storage tank 4. For this purpose, on a wider corner region 27 of the tank 4, a removal opening 28 is provided that can have a corresponding fluid coupling. The removal opening 28, similarly to the wall surface 9, is located in the intersection region of three side surfaces of the storage tank 4 and is located diagonally opposite the wall surface 9 on the storage tank 4. The position of the removal opening 28 permits the removal opening 28 to come to rest at the lowest point of the storage tank 4 in the two intended installation positions of the fluid cooling device 1. Likewise, FIG. 6 shows a view of the return connecting piece 15 for fluid that is routed from the hydraulic working circuit back to the heat exchanger 5. This return connecting piece 15 is located on the bottom of the box-shaped inlet distribution channel 21.

While one embodiment has been chosen to illustrate the invention, it will be understood by those skilled in the art that various changes and modifications can be made therein without departing from the scope of the invention as defined in the appended claims.

What is claimed is:

1. A fluid cooling device forming a structural unit, comprising:

a drive motor;

a rotatable fan impeller driven by said drive motor;

a storage tank having connectors that convey fluid into a hydraulic circuit where the fluid is heated and that receive cooled fluid, said drive motor and said fan impeller being mounted on said storage tank;

a heat exchanger coupled to said storage tank, said heat exchanger receiving and cooling the fluid from the hydraulic circuit and conducting that fluid to said storage tank; and a filling opening and a fill-level indicator located in a corner region of said storage tank allowing said filling opening and said indicator to be used and read to accurately indicate fluid level in said storage tank in both a vertical first installation direction and a non-vertical second installation direction tilted relative to said first installation direction.

2. A fluid cooling device according to claim 1 wherein said second installation direction is at a right angle to said first installation direction.

3. A fluid cooling device according to claim 2 wherein said filling opening is located on a wall surface of said storage tank connecting three side walls of said storage tank in corner regions of said three side walls.

4. A fluid cooling device according to claim 3 wherein said three side walls are planar.

5. A fluid cooling device according to claim 2 wherein said fill-level indicator comprises a scaling readable in both said first and second installation directions, is located on an outside of one side wall of said storage tank and is located in a region of a fill-level check opening closed by a sealing element.

6. A fluid cooling device according to claim 5 wherein said fill-level indicator is located in a countersink in an outline of said storage tank;
said sealing element is non-transparent; and
said one side wall is transparent.

7. A fluid cooling device according to claim 5 wherein said fill-level indicator is located in a countersink in an outline of said storage tank;
said sealing element is transparent; and
said one side wall is non-transparent.

8. A fluid cooling device according to claim 2 wherein said storage tank comprises planar sides.

9. A fluid cooling device according to claim 1 wherein a portion of said corner region of said storage tank in which said filling opening is located is defined by a tilted triangular wall surface connecting three side walls of said storage tank.

10. A fluid cooling device according to claim 9 wherein said three side walls are planar.

11. A fluid cooling device according to claim 1 wherein said first installation direction is parallel to a first side wall of said storage tank encompassing said fan impeller on a face side thereof; and
said second installation direction is parallel to a second side wall of said storage tank in which said fill-level indicator is located.

12. A fluid cooling device according to claim 1 wherein said heat exchanger is within an outline of said storage tank and is enclosed on at least two sides thereof by said storage tank.

13. A fluid cooling device according to claim 1 wherein a pressure relief valve is located in a wall of said storage tank on the structural unit adjacent to and outside of said filling opening and said fill-level indicator.

14. A fluid cooling device according to claim 1 wherein a return flow connecting piece is rearrangably located on the structural unit for receiving flow from the hydraulic circuit.

15. A fluid cooling device forming a structural unit, comprising:
a drive motor;
a rotatable fan impeller driven by said drive motor;
a storage tank having connectors that convey fluid into a hydraulic circuit where the fluid is heated and that receive cooled fluid and having first, second and third side walls that are perpendicular to each other, said drive motor and said fan impeller being mounted on said storage tank;
a heat exchanger coupled to said storage tank, said heat exchanger receiving and cooling the fluid from the hydraulic circuit and conducting that fluid to said storage tank;
a filling opening and a fill-level indicator located in a corner region of said storage tank allowing said filling opening and said indicator to be used and read to accurately indicate fluid level in said storage tank in both a vertical first installation direction and a non-vertical second installation direction tilted relative to said first installation direction; and
a tilted triangular wall surface connecting said first, second and third side walls of said storage tank in adjacent corner sections thereof and being at a non-perpendicular angle to each of said side walls, said filling opening being in said tilted triangular wall surface.

16. A fluid cooling device according to claim 15 wherein said second installation direction is at a right angle to said first installation direction.

17. A fluid cooling device according to claim 16 wherein said fill-level indicator comprises a scaling readable in both said first and second installation directions, is located on an outside of one of said side walls of said storage tank and is located in a region of a fill-level check opening closed by a sealing element.

18. A fluid cooling device according to claim 15 wherein said first installation direction is parallel to said first side wall of said storage tank encompassing said fan impeller on a face side thereof; and
said second installation direction is parallel to said second side wall of said storage tank in which said fill-level indicator is located.

19. A fluid cooling device according to claim 15 wherein a pressure relief valve is located on one of said side walls adjacent to and outside of said filling opening and said fill-level indicator.

20. A fluid cooling device according to claim 15 wherein said side walls are planar.

* * * * *